Oct. 26, 1943.   C. F. W. BORGWARD   2,332,838
STEERING GEAR
Filed July 1, 1939   2 Sheets-Sheet 1

Inventor:
Carl Friedrich Wilhelm Borgward,
by Frank S. Appleman,
attorney.

Oct. 26, 1943.  C. F. W. BORGWARD  2,332,838
STEERING GEAR
Filed July 1, 1939  2 Sheets-Sheet 2

Inventor:
Carl Friedrich Wilhelm Borgward
By Frank S. Appleman,
attorney.

Patented Oct. 26, 1943

2,332,838

UNITED STATES PATENT OFFICE 2,332,838

STEERING GEAR

Carl Friedrich Wilhelm Borgward, Bremen, Germany; vested in the Alien Property Custodian Application July 1, 1939, Serial No. 282,544
In Germany April 21, 1939

7 Claims. (Cl. 180—9.2)

Steering gear for chain driven vehicles is known wherein between the driving wheels of the chain is arranged a differential gear the shafts of which are given different velocities by auxiliary transmission gear when the vehicle is veered.

The invention relates to a steering gear wherein the driven shafts of the driving wheels are adapted to be braked by means of self-locking worm gearing with an auxiliary transmission drive. The latter is driven at variable frequency and serves to control the self-locking effect of the worm gear. Since upon braking one of the driving shafts energy is dissipated, the braking force for a high speed and small radius of curvature is very great. If the differential gear used is the normal double differential gear, in order to decrease the braking force an external bevel wheel in the gear casing is braked. If this is done by means of a brake drum, the vehicle travels over the smallest radius of curvature when the drum is stationary. If, however, a worm gear is used for braking then the worm rotates continuously and the worm wheel is never stationary.

According to the invention a worm gear is used for braking and the auxiliary drive for the worm shafts of the worm gear is effected from the main shaft with the interposition of a continuously variable gear. The limit of regulation of the latter is so adapted to the transmission ratio of the differential gear that the vehicle travels over the desired smallest radius of curvature for the minimum rotational frequency of the worm gear.

With this arrangement the braking force on the driving axle is very great.

According to a further feature of the invention a slipping coupling is provided between the main driving shaft and the continuously variable gear, and an energy storing device for accelerating the worm shafts is used which continuously gives the worm shafts as great a lead as is permitted by the worm wheels driven by the differential gear.

The drive of the worm shaft may be effected from the main driving shaft with the interposition of a differential gear and the different relative rotational frequencies of the worm shafts is effected by a continuously variable gear operating directly upon both worm shafts.

Various embodiments of the invention are illustrated by way of example in the accompanying drawings in which.

Figure 1:
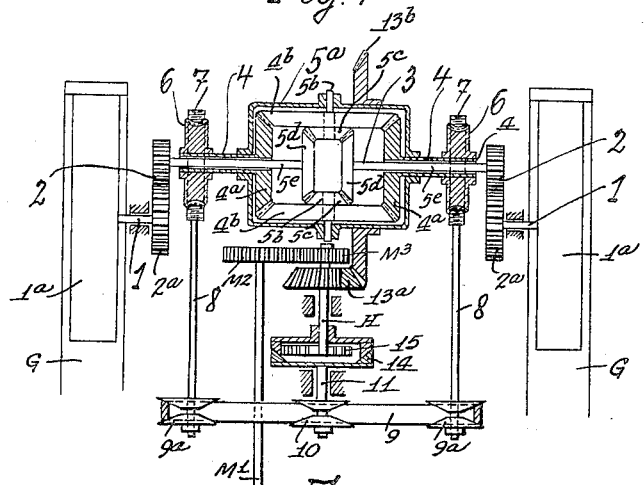
Fig. 1 is a diagrammatic plan view of one form of gear.
Figure 2:
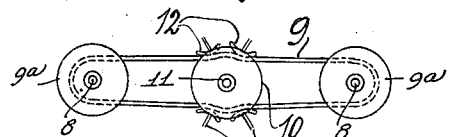
Fig. 2 is a detail view.

The main shaft H, carrying bevelled gear 13a, may be driven, for example, by a motor shaft M', through the medium of gears $M^2$ and $M^3$ (Fig. 1). The bevelled gear 13a in turn causes rotation of the bevelled gear 13b fixed on the differential housing 5. In said differential housing are mounted the bevel gear wheels 4b supported on shafts 5b which also serve to support the bevelled gear wheels 5c. The wheels 4b mesh with the bevelled gear wheels 4a, while wheels 5c mesh with the bevelled gear wheels 5d which are mounted on the shafts 5e. The shafts or axles 1 drive the sprockets 1a of the chain tracks G and are driven by shafts 5e through the medium of the gearing 2. The bevelled wheels 4a cause rotation of the worm wheels 6 through the medium of the hollow shafts 4 in the same direction as shafts 5e. The shafts 5e, hollow shafts 4, bevelled wheels 4a and 5d all have the same direction of rotation, namely, the direction of rotation of bevelled gear 13b of differential housing 5a.

The main shaft H drives the shaft 11 through a clutch member 14 provided with a shock absorbing spring 15. Said shaft 11 carries the central pulley 10 of the continuously variable gearing 9, 9a capable of being adjusted without interruption. This adjustable gearing 10, 9, 9a is constructed in known manner. It comprises two reciprocally adjustable bevelled wheel disks 9a, 9a, which are driven by an endless chain 9 and are mounted on shafts 8 supporting worms 7 which, in turn, mesh with the worm wheels 6. When the vehicle is on a straight track, the worm shafts 8 and consequently worms 7 are uniformly revolved at such speeds as to conform to the rotation of the wheels 6 by the gears 4a and the self-locking tendency of the worm gears 6 is eliminated. The drive of the worm gears 6 is continuously effected from the differential gear through the hollow shafts 4.

For the purpose of steering the vehicle, the transmission between the two worm shafts 8 is achieved by adjustment of adjustable gear 10, 9, 9a, by suitable means (not shown) to effect bringing of the pulleys on one side of the vehicle closer together and the pulleys on the other side of the vehicle proportionally away from each other. As a result of this, on one side of the vehicle, worm 7 will resist the rotative movement of wheel 6, while on the other side of the vehicle the worm is free to rotate at a greater speed and the braking effect is removed.

By reason of this, the bevelled gear 4a lying on the side which is subjected to braking is made to revolve slower than the housing, which causes the bevelled gear 4a lying on the other side to revolve more rapidly. As a result of this, the shaft 5e will also revolve slower on one side of the vehicle and more rapidly on the other side.

The slip coupling 14 is merely provided for the purpose of avoiding differences in the number of revolutions and to prevent breaking of the adjustable gear. The slip coupling is also connected to energy storing means adapted to give the worm shaft 8 an acceleration, the simplest form of such a device being the spring 15, which will cause the worm shafts 8, and consequently worm 7, to be driven ahead or with a slight lead with respect to worm wheels 6. The adjustable gear 10, 9, 9a, therefore, does not cause the transmission of power, since the drive of the differential gear and of the vehicle itself is accomplished exclusively by means of the bevelled wheel gears 13a, 13b, and thus through differential 5a. The endless chain 9 is held on the pulley 10 by means of pressure members 12.

Figure 3:
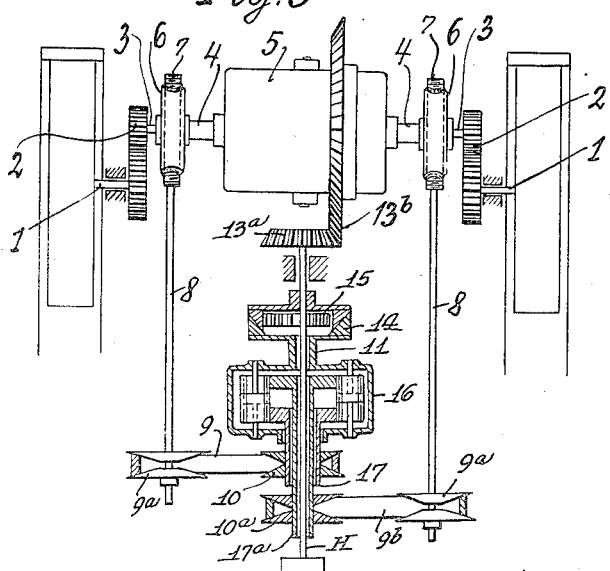
Fig. 3 is a diagrammatic plan view of a second form of gear.

In the embodiment shown in Fig. 3, the drive of worm shafts 8 is accomplished by motor M through the main drive shaft H and wheels 13a, 13b to the differential gear 5. Also, in this case the slip coupling is driven by shaft H through spring 15. Shaft 11 of the clutch member 14 drives the spur wheel compensating gear 16 having a conventional structure. The hollow shafts 17, 17a carrying the pulleys 10, 10a extend from the spur wheel compensating gear 16, said pulleys 10, 10a causing the rotation of the reciprocally adjustable bevelled wheel disks 9a, as shown in Fig. 1, by means of endless chains 9, 9b. The operation is similar to that of Fig. 1, with the only difference that in this case the worm shafts 8 of worm 7 are driven with the insertion of the differential gear 16.

The regulation of the continuously variable gear may be effected in known manner by chain or belt driving.

In the case of a double differential gear having an arithmetical transmission ratio in combination with the regulation of variable frequency by a continuously variable gear having a geometric transmission ratio there is the disadvantage that differences in the number of revolutions between the differential gear and the continuously variable gear may arise. If, however, a second differential gear of small dimensions is used for driving the worm gearing (as shown in Fig. 4) then the different transmission ratios of the continuously variable gear and the differential gears are compensated.

According to a further feature of the invention, in the drive of the worm through the worm wheel, upon axial displacement of the worm the latter is braked for example by means of a braking disc which in the case of a non-locking worm increases the friction of the worm gearing.

In such a way the force necessary is considerably reduced and according to the extent of the additional braking of the worm shaft, the worm itself can be made less self-locking or the self-locking effect may even be dispensed with.

Figure 4:
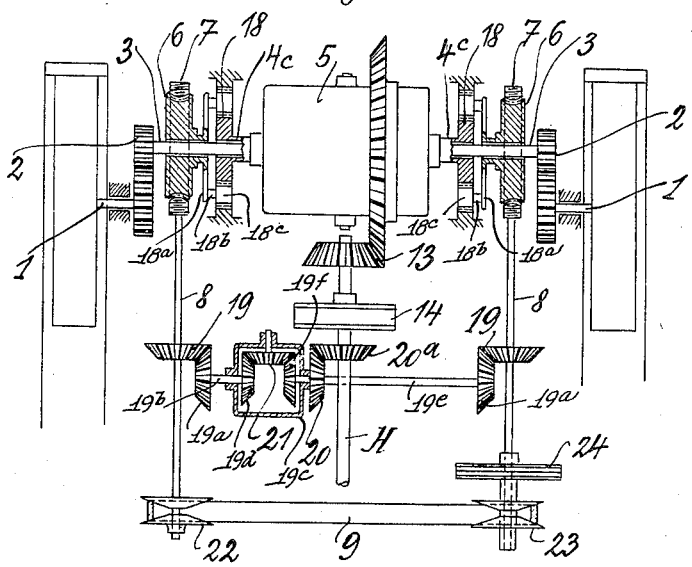
Fig. 4 is a similar view of a third form of gear.

In the form shown in Figure 4, the general arrangement is similar to that shown in Fig. 1, certain of the parts being identical and indicated by the same reference characters. However, the sleeves 4 are not used, but the gears 4a (not shown in Fig. 4) are carried by sleeves 4c which project from each end of the casing and each carries a spur gear 18. Fixed to each worm gear 6 is a spider 18a which carries stub shafts 18b whereon are mounted spur gears 18c which mesh with the respective gears 6. Also in this form the shafts 8 are connected for differential movement in the following manner. Fixed on each shaft 8 is a bevel gear 19 which meshes with a bevel gear 19a. One of the gears 19a is fixed on a short shaft 19b which extends into a differential gear housing 19c and carries a bevel gear 19d. The other gear 19a is similarly fixed on a shaft 19e which extends into the housing 19c in alinement with the shaft 19b and carries a bevel gear 19f. An idler 21 is journaled in the housing 19c to revolve therewith and the idler 21 meshes with the gears 19d and 19f. Fixed to the housing 19c to revolve therewith is a bevel gear 20 which meshes with a bevel gear 20a fixed on the shaft H. Finally, a friction or slip coupling 24 connects the pulley 23 with the corresponding shaft to compensate the effect of inequality of drive between the shafts 8, due to the belt 9 and that due to the differential gearing just described.

Figure 5:
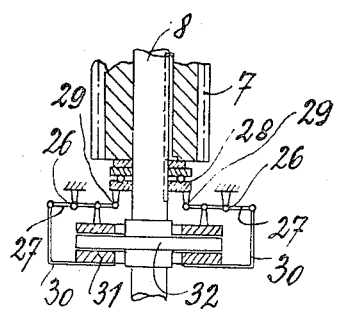
Fig. 5 shows one form of worm gear braking device for use with the gear of Fig. 4.

In Fig. 5, worm 7 is driven through worm wheel 6 and upon braking by axial shift of the worm, the latter can also be braked. For this purpose, use may be made, for example, of the usual braking disc against which the worm is pressed.

If desired the braking disc may be conical so that braking is effected by surface pressure as well as by a wedge effect. The axial displacement of the worm increases the frictional value of the worm gear if a non-self-locking worm is used. In this way the force necessary is considerably reduced.

In Fig. 5 the worm 7 is braked even for small axial displacements, the pressure of the discs being increased by means operated upon the axial displacement of the worm and acting upon the brake blocks. For this purpose brake levers 27 rotatably mounted at 26 are provided which engage the worm at 29 with the interposition of ball bearings 28 and are connected with braking discs 31 by means of rods 30 acting on the fixed disc 32. Upon a small axial displacement of the worm 7 which is mounted to rotate with the shaft, the pressure is increased by the action of the levers. According to the extent of the additional braking of the worm wheel shaft 8 effected by the axial displacement, the worm can be made less or even non-self-locking.

I claim:

1. In a steering gear for chain driven vehicles, a pair of drive wheels, axles carrying said drive wheels and secured thereto, gears fixed on said axles, driving gears meshing with the first gear, a double differential gearing including a case having alined shafts carrying the driving gears and sleeves rotatably mounted on the shafts, a worm wheel drive for each sleeve, a driven main shaft, bevel gearing connecting said main shaft and case, a pair of worms meshing with said worm wheels, worm shafts carrying said worms, a spur wheel differential gear and variable speed driving means for driving the worm shafts from the main shaft, and a slipping coupling having energy storing means connected thereto disposed between the main shaft and the variable speed driving means adapted to give the worm shafts an acceleration which is compensated by said slipping coupling and which is of the maximum value permitted by the rotation of the worm wheels.

2. In a steering gear for chain driven vehicles, a pair of drive wheels, axles carrying said drive wheels and secured thereto, gears fixed on said axles, driving gears meshing with the first gear, a double differential gearing including a case having alined shafts carrying the driving gears and sleeves rotatably mounted on the shafts, a worm wheel drive for each sleeve, a driven main shaft, bevel gearing connecting said main shaft and case, a pair of worms meshing with said worm wheels, worm shafts carrying said worms, and variable speed driving means connecting the worm shafts and main shaft.

3. Steering gear according to claim #2 wherein the variable speed driving means operates through a slipping coupling.

4. Steering gear according to claim #2 wherein the variable speed driving means operates through a slipping coupling connected to energy storing means adapted to give the worm shafts an acceleration which is compensated by said slipping coupling and which is of the maximum value permitted by the rotation of the worm wheels.

5. Steering gear according to claim #2 wherein the worm shafts of the worm gear are driven from the main driving shaft through differential gear, the worm shafts being directly interconnected through variable speed driving means.

6. Steering gear according to claim #2 wherein the worms of a non-self-locking worm gear are adapted to be displaced axially and are braked by a braking disc adapted to increase the friction of the worm gear.

7. Steering gear according to claim #2 wherein the worms of a non-self-locking worm gear are adapted to be displaced axially and are braked by braking discs provided with means for increasing the pressure of said discs for small axial displacements of the worms.

CARL FRIEDRICH WILHELM BORGWARD.